June 6, 1950 J. D. REID 2,510,906

FREQUENCY MODULATION RECEIVER

Filed March 24, 1945 2 Sheets-Sheet 1

INVENTOR.
John D. Reid
BY
Darby + Darby
ATTORNEYS

FREQUENCY MODULATION RECEIVER

Filed March 24, 1945 2 Sheets-Sheet 2

INVENTOR
JOHN D. REID
BY Darby & Darby
ATTORNEYS

UNITED STATES PATENT OFFICE 2,510,906

FREQUENCY MODULATION RECEIVER

John D. Reid, Mount Healthy, Ohio, assignor, by mesne assignments, to AVCO Manufacturing Corporation, a corporation of Delaware Application March 24, 1945, Serial No. 584,534

6 Claims. (Cl. 250—20)

An object of this invention is to provide a frequency modulation receiver circuit, and method of operation, which is highly selective, has high gain, has a high signal to noise ratio, and has other advantages to be enumerated.

A feature of this invention is the use in an FM receiver of a highly selective intermediate frequency circuit which may be designed to pass a narrow band of frequencies on the order of 10 kc. band width in the reception of fully modulated wide band FM signals, having a deviation of plus or minus 75 kc. such as are now authorized by the Federal Communications Commission.

Another feature of this invention is the use of a local heterodyne oscillator which is controlled by the incoming signal so that its frequency is varied at an audio rate corresponding to a fixed ratio with the frequency deviation of the incoming signal.

An important attribute of this invention is that it permits flexibility of FM transmitter standards.

Another important attribute of my invention is that it permits efficient utilization of the radio spectrum, since it increases adjacent channel selectivity and will therefore permit a closer spacing of transmitter channels.

Figure 1:
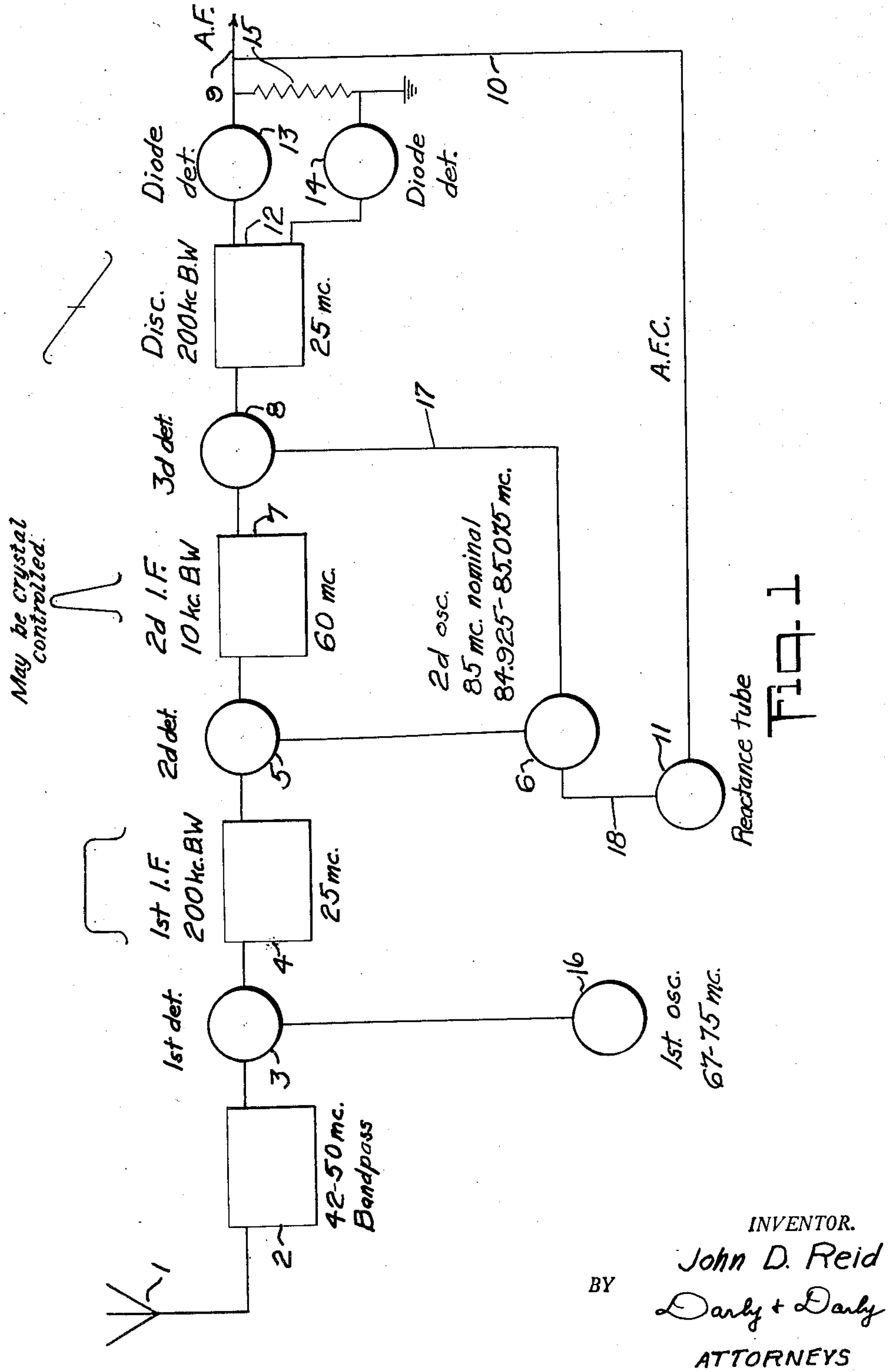
Figure 2:
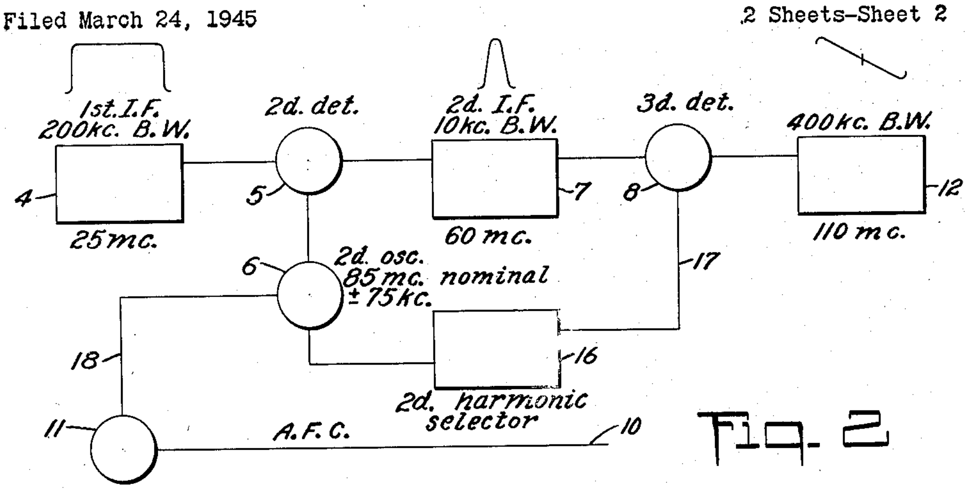
Figure 3:
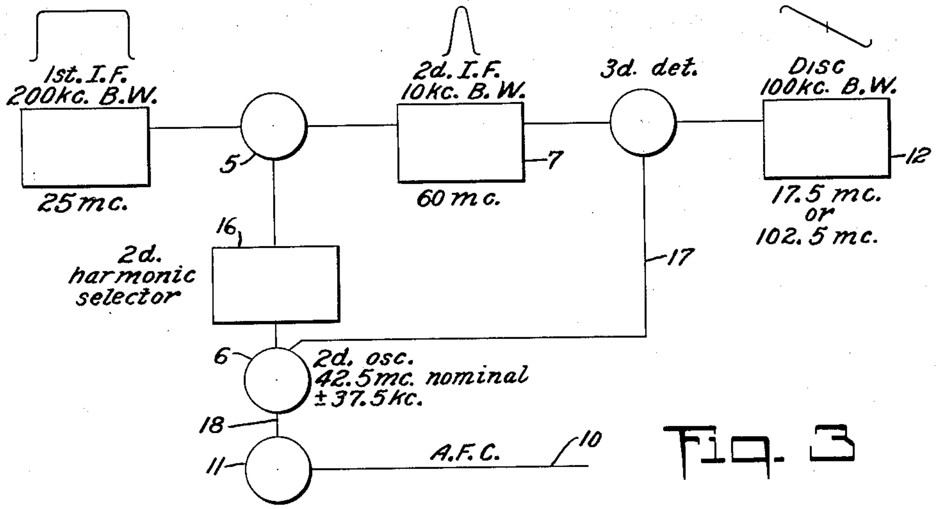
Figure 4:
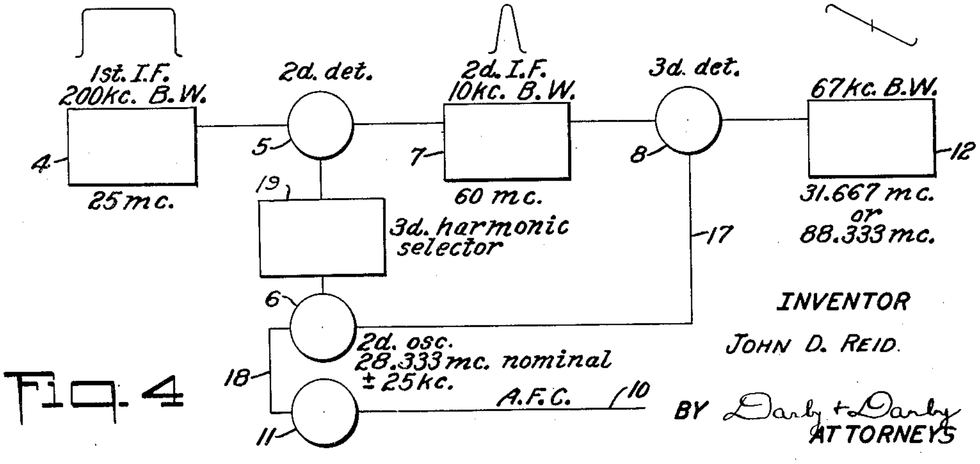

In the drawings Figure 1 is a circuit diagram in block form of a circuit in accordance with my invention, and Figures 2, 3 and 4 are partial circuit diagrams in block form of three modifications. In all figures the same reference numerals refer to the same parts, and the partial circuits of Figures 2, 3 and 4 are to be substituted for the corresponding parts of Figure 1 in using these modifications.

The drawing illustrates a receiver designed to receive any frequency modulated signal within the presently authorized band of 42 to 50 mc. The signal is received upon an antenna 1 and supplied to an input circuit 2 which is bandpass for the entire FM band. The output of the circuit 2 is supplied to a first detector or converter 3 to which is also supplied the output of the first oscillator 16. The first oscillator may be designed to produce any frequency from 67 to 75 mc. in order to produce a first intermediate frequency of 25 mc. for any selected signal. The output of the first converter 3 is supplied to the first intermediate frequency circuit 4. This circuit has a center frequency of 25 mc. and is designed to pass a band of frequencies 200 kc. wide. The output of the first intermediate frequency circuit is supplied to a second detector or converter 5, to which is also supplied oscillations from the output of a second oscillator 6. The oscillator 6 is designed to oscillate at any frequency from 84.9 to 85.1 mc. That is, for 100 kilocycles on either side of a nominal frequency of 85 mc. This frequency of oscillation is controlled by an automatic frequency control circuit to be described. The output of the converter 5 is supplied to a second intermediate frequency circuit 7. This circuit has a center frequency of 60 mc. and may be designed to pass a narrow band of frequencies on the order of 10 kc. band width. The output of the second intermediate frequency circuit is supplied to a third detector or converter 8, to which is also supplied a portion of the output of the second oscillator 6 through lead 17. The output of the third converter 8 is supplied to a balanced discriminator and detector circuit of 25 mc. center frequency and 200 kc. bandwidth such as that shown, for example, in my Patent Number 2,279,058. The audio frequency output of the diode detector appearing on the lead 9 may be supplied to an audio frequency amplifier and loudspeaker to reproduce the transmitted signal. The same audio frequency signal is also supplied through the lead 10 to the reactance tube 11 which controls the frequency of oscillations of the second oscillator 6.

It is characteristic of a balanced discriminator and detector circuit such as that shown in my patent mentioned above that it produces an audio frequency output voltage which has a zero value for a center frequency and a positive or negative value depending upon the extent of deviation of the signal above or below this center frequency. The voltage on the lead 10 will, therefore, be an alternating current audio frequency voltage. The reactance tube 11 causes the oscillator 6, to which it is connected through leads 18, to oscillate at a frequency depending upon this voltage in a manner such as is shown for example in Koch Patent No. 2,282,974. When this audio frequency voltage is zero, oscillator 6 will produce oscillations of 85 mc. The oscillations produced by this oscillator will vary between the limits of 85 mc. plus or minus 100 kc. depending upon the control voltage supplied to the reactance tube 11.

To explain the operation of my circuit, let us assume that the signal it is desired to receive is a wide band frequency modulated carrier signal having a center frequency of 46 mc. deviating up to 75 kc. on either side of this center frequency. This signal will be passed by the input circuit 2 and the first oscillator 16 will be tuned to produce oscillations of 71 mc. The output of the first converter 3 will accordingly have a center frequency of 25 mc. with deviations up to plus or minus 75 kc. about this center frequency. The first intermediate frequency circuit is designed to have a band pass characteristic which will pass a band of frequencies 200 kc. wide so that the full band of signal modulations will pass this circuit. The input to the second converter 5 from the first intermediate circuit 4 will accordingly be a 25 mc. carrier deviating up to plus or minus 75 kc. about this center frequency.

The second oscillator 6 produces the same frequencies regardless of the frequency of the selected signal. It will accordingly produce a frequency of 85 mc. plus or minus any variation up to 75 kc. on either side of this frequency, depending upon the audio frequency control voltage supplied to the reactance tube 11. As this frequency of oscillation is varying at an audio frequency rate controlled by the audio ouput, its variations in frequency will follow the variations in frequency of the output of the first intermediate frequency circuit 4. That is, when the incoming signal deviates to a value of 46.050 mc., as the oscillator 16 is producing a frequency of 71 mc., the output of circuit 4 will be 24.950 mc. The frequency produced by the oscillator 6 will vary accordingly and will accordingly have a value of 84.950 mc. The output of the second converter 5 will contain the difference between these two frequencies, or a frequency of 60 mc.

If the incoming signal should deviate in the other direction to a frequency of 45.950 mc. as the oscillator 16 is still producing a frequency of 71 mc. the output of the first intermediate frequency circuit 4 will have a frequency of 25.050 mc. The second oscillator 6 at this instant will have a frequency of 85.050 mc., still producing in the output of the second converter 5 the same second intermediate frequency of 60 mc.

It will thus be seen that whether the incoming received signal is undeviated carrier, or whether it deviates to any extent within 100 kc. above or below the carrier or center frequency, the output of the second converter 5 will always contain the same frequency of 60 mc.

The carrier frequency of 60 mc. in the output of the second intermediate frequency circuit 7 is supplied to the third converter 8, to which is also supplied a portion of the output of the second oscillator 6. In this third converter these two waves beat together and produce in the output of the converter a frequency modulated carrier having a center frequency of 25 mc. with deviations up to plus or minus 75 kc. about this center.

In the output of the third converter 8 is a balanced discriminator 12 and a pair of diode detectors 13 and 14 such as shown, for example, in Seeley Patent No. 2,121,103. The output of this circuit across the resistance 15 is an audio frequency voltage appearing on the leads 9 and 10. This voltage on the lead 9 may be further amplified in an audio frequency amplifier and translated in a loudspeaker for reproduction of the signal. The same voltage appearing on the lead 10, without any time constant or delay circuit, is supplied to the reactance tube 11. As before stated this voltage is an alternating current voltage varying about a zero value, the zero value corresponding to an undeviated incoming carrier. When this variation is zero the reactance tube 11 will cause the second oscillator 6 to oscillate at 85 mc. and, as before stated, its oscillations will vary up to 100 kc. above and below this center frequency at an audio frequency rate in correspondence with the transmitted audio signal. (In the circuit illustrated, as the incoming signal deviates downward in frequency the oscillator 6 deviates upward, but a direct relationship could also be used.)

If by coincidence when the desired station modulates to maximum, or even overmodulates, the adjacent channel or transmitter is also highly modulated and deviates towards the desired signal at the exact same instant so that its interfering signal falls on the return slope of the overall selectivity, its effect will only be momentary since it cannot capture control of the second oscillator because the slope outside the pass band is reversed. That is, beyond the band width of the received signal the effect of the interfering signal would be to drive the frequency of the oscillator 6 in the wrong direction.

I have pointed out above that the second intermediate frequency circuit 7 may have a very narrow band width on the order of 10 kc. and that the frequency of the signal in the second intermediate frequency circuit will be an undeviated carrier frequency of 60 mc. It is accordingly possible to use a highly selective circuit for this second intermediate frequency circuit, such as a crystal controlled filter for example. This second intermediate frequency may be amplified if desired, and more than one such highly selective circuit may be used. The fact that I employ such a highly selective band pass circuit increases the signal to noise ratio in my receiver to a very high value. In this connection any band width less than the carrier deviations (in the case described 150 kc.) should be considered a narrow band pass, as I am, in effect, compressing or eliminating the deviations to pass them through this circuit.

It is also to be noted that in the example described the band width of the discriminator 12 and the limits of the frequency produced by the second oscillator 6 about its center frequency should be plus or minus 100 kc. Accordingly if the transmitter occasionally overmodulates the full modulation of the signal will be received. The band width of the discriminator therefore determines the maximum deviation that the receiver will respond to. The overall band width is determined by the second intermediate frequency whose narrow band is moved in synchronism with the transmitter deviation. Thus, except for the times corresponding with the peaks of modulation the return slopes of the intermediate frequency are contained within the desired channel and not subject to interference from an undesired adjacent channel station. Accordingly I secured very high adjacent channel selectivity. This makes it possible to space the transmitter channels more closely in the spectrum than is the present practice. At the present time these channels are 400 kc. apart for stations in the same area despite the maximum deviation permitted being plus or minus 75 kc. By using receivers in accordance with my invention transmitters may in the same area be spaced 200 kc. apart or even closer, and the present deviation still permitted, without interference.

My circuit will receive, with equal facility, frequency modulated signals of any degree of deviation. The overall band width of my receiver may be altered by varying the discriminator band width, a simple change, without lessening the adjacent channel selectivity. Changing standards as to the amount of deviation may therefore be easily taken care of in my circuit. Thus, the use of my invention will permit flexibility in transmitter standards.

The deviation of the incoming FM signal may be either increased or decreased in the receiver. By selecting the second harmonic of the oscillator 6 by means of the selector 16 and applying this to the third detector 8, and by choosing a frequency of 110 megacycles for the discriminator 12, with a bandwidth of 400 kc. the frequency deviation received from the transmitter can be doubled. This is illustrated in Figure 2. This same principle can be applied for higher harmonics which will increase the deviation by the factor of the harmonic chosen.

By operating the second oscillator 6 at ½ its normal frequency, and by applying the second harmonic to the second converter through harmonic selector 17 and the fundamental to the third converter, the deviation of the incoming signal can be reduced by a factor of ½ in the receiver. This is illustrated in Figure 3. As applied to the illustrated receiver, the oscillator 6 would be designed for a nominal frequency of 42.5 megacycles and would be controlled ±37.5 kc. The discriminator 12 would be designed for 17.5 megacycles with a peak-to-peak bandwidth of 100 kc. or if desired, the sum of the oscillator and second IF could be used and the discriminator 12 designed for 102.5 megacycles.

By operating the second oscillator 6 at ⅓ its normal frequency, and applying the third harmonic to the second converter through harmonic selector 18, the deviation in the receiver could be reduced by ⅓. This is illustrated in Figure 4. This same principle can be applied to obtain whatever reduction in deviation is desired.

It will be understood that the circuits and values chosen for description in this application are illustrative, and that my invention is not limited thereto. It will also be understood that my invention is capable of various modifications, and I do not desire therefore to be restricted to the particular details shown and described but only within the scope of the appended claims.

What is claimed is:

1. A frequency modulation receiver comprising a pair of converters, a filter intercoupling said converters having a pass band narrow with respect to the extent of deviation of an incoming frequency modulated carrier, an oscillator, means for supplying a portion of the output of said oscillator to each of said converters, means for producing an audio frequency voltage from said incoming frequency modulated carrier, and means for controlling the frequency of said oscillator by said audio frequency voltage to deviate in frequency at a rate equal to the rate of deviation of an incoming signal and to the same extent.

2. A frequency modulation receiver comprising an input circuit, a first oscillator operable at a fixed frequency for any particular received signal, a first converter in the outputs of said input circuit and said first oscillator, a first intermediate frequency circuit in the output of said first converter, a second oscillator, a second converter in the outputs of said first intermediate frequency circuit and second oscillator, a narrow pass band second intermediate frequency circuit in the output of said second converter, a third converter in the outputs of said second oscillator and said second intermediate frequency circuit, a balanced discriminator and detector circuit in the output of said third converter for producing an audio frequency voltage, means for translating said audio frequency voltage, and means for controlling the frequency produced by said second oscillator by said audio frequency voltage, to be substantially equal in frequency deviation rate and extent to the frequency deviation rate and extent of the received signals.

3. A frequency modulation receiver comprising an input circuit, a first oscillator operable at a fixed frequency for any particular received signal, a first converter in the outputs of said input circuit and said first oscillator, a wide band pass first intermediate frequency circuit in the output of said first converter, a second oscillator, a second converter in the outputs of said first intermediate frequency circuit and said second oscillator, a narrow pass band second intermediate frequency circuit in the output of said second converter, a third converter in the outputs of said second oscillator and said second intermediate frequency circuit, a balanced discriminator and detector circuit in the output of said third converter for producing an audio frequency voltage, means for translating said audio frequency voltage, and means for controlling the frequency produced by said second oscillator by said audio frequency voltage, to be substantially equal in frequency deviation rate and extent to the frequency deviation rate and extent of the received signals.

4. A receiver in accordance with claim 2, in which the audio frequency voltage varies above and below zero value.

5. A frequency modulation receiver comprising heterodyne means for contracting transmitted signals deviating in frequency at an audio rate to signals without substantial deviation from a center frequency, means for reconverting the last-mentioned signals to frequency modulated signals of equal deviation with the original transmitter deviations, and a narrow band pass amplifier coupled between the output of the said heterodyne means and the said reconverting means.

6. A frequency modulation receiver comprising heterodyne means for contracting transmitted signals deviating in frequency at an audio rate to signals without substantial deviation from a center frequency, means for reconverting the last-mentioned signals to frequency modulated signals of less deviation than the original transmitter deviations, and a narrow band pass amplifier coupled between the output of the said heterodyne means and the said reconverting means.

JOHN D. REID.

REFERENCES CITED

The following references are of record in the file of this patent:

UNITED STATES PATENTS

| Number | Name | Date |
|---|---|---|
| 1,842,898 | de Bellescize | Jan. 26, 1932 |
| 2,087,429 | Crosby | July 20, 1937 |
| 2,101,703 | Crosby | Dec. 7, 1937 |
| 2,115,360 | Crosby | Apr. 26, 1938 |
| 2,259,000 | Nyquist | Oct. 14, 1941 |
| 2,273,110 | Kimball et al. | Feb. 17, 1942 |
| 2,282,974 | Koch | May 12, 1942 |
| 2,288,575 | Stablein | June 30, 1942 |
| 2,340,432 | Schock | Feb. 1, 1944 |
| 2,357,975 | Roberts | Sept. 12, 1944 |
| 2,369,268 | Trevor | Feb. 13, 1945 |
| 2,383,359 | Ziegler | Aug. 21, 1945 |
| 2,407,212 | Tunick | Sept. 3, 1946 |
| 2,416,791 | Beverage | Mar. 4, 1947 |